United States Patent Office 3,055,735
Patented Sept. 25, 1962

3,055,735
PROCESS FOR THE PRODUCTION OF ALKALI
PHOSPHATE
Shigeru Suzuki, Masatsugu Shimoyamada, Hiroshi Akabayashi, Yoshihisa Ogawa, and Toshihiro Iwatsuki, all of Tokyo, Japan, assignors to Nissan Chemical Industries, Ltd., Tokyo, Japan, a corporation of Japan
No Drawing. Filed Feb. 2, 1959, Ser. No. 790,381
Claims priority, application Japan Feb. 13, 1958
1 Claim. (Cl. 23—107)

This invention relates to a process for producing sodium phosphate from crude phosphoric acid solution and crude caustic sodium solution by using ion-exchange resins. More particularly, the present invention relates to a process for producing sodium phosphate solution of high purity and high concentration or crystals thereof from a phosphoric acid solution of not very low purity but very low concentration, or a crude phosphoric acid solution such as impure phosphoric acid solution which does not contain any acid radical other than phosphoric radical but contains various cations, and a solution of caustic sodium, sodium carbonate or diluted caustic sodium, or a crude caustic sodium solution such as impure caustic sodium which contains impurities of sodium chloride, sodium sulfate and the like.

Heretofore, sodium phosphate is generally produced by neutralizing with sodium carbonate or caustic sodium from phosphoric acid obtained either by the so-called dry process of oxidizing elementary phosphorus or by the so-called wet process of decomposing phosphate rock with sulfuric acid. In these cases, if phosphoric acid of the dry process is used for the starting material, sodium phosphate of high concentration and high purity can be obtained, but the product is expensive since much energy such as electricity is consumed in the production of phosphoric acid by the dry process. On the other hand, though phosphoric acid of the wet process can be produced at low cost, the acid is low in purity and also in concentration. If to this acid is added an alkali such as caustic soda or sodium carbonate to produce sodium phosphate, impurities are precipitated at the same time thereby lowering the purity and the yield of the product, thus leading to a rise in production cost. Moreover, the neutralizing agent to be used in the dry or wet process must be sodium carbonate or caustic sodium of high purity which is produced by an expensive process such as electrolytic or ammonia-soda process. From this view point, it is inevitable that sodium phosphate produced by conventional processes is expensive.

It is, therefore an object of the present invention to eliminate the above disadvantages of the conventional processes and to provide a process wherein sodium phosphate of high concentration and high purity is produced at low cost by using impure dilute phosphoric acid or caustic sodium solution, or impure caustic sodium solution such as direct electrolyte of brine.

The process of the invention comprises a first step in which an anion exchange resin selected from the group consisting of OH, $PO_4$ and $HPO_4$ type anion exchange resins or a mixture thereof is passed through a crude phosphoric acid solution to adsorb phosphoric ions to be converted to an $H_2PO_4$ type anion exchange resin, and a second step in which the $H_2PO_4$ type anion exchange resin thus produced is passed through a solution of di-sodium phosphate thereby to be converted to an anion exchange resin selected from the group consisting of OH, $PO_4$ and $HPO_4$ type and a mixture thereof, and at the same time to obtain a solution of mono-sodium phosphate.

If a dilute or impure caustic sodium is used as the alkali, the steps are carried out such that a crude caustic sodium solution is passed through an H type weakly acidic cation exchange resin to convert the resin to an alkali type and then a portion of the mono-sodium phosphate solution obtained by the second step is passed through the sodium type ion exchange resin to re-convert it to an H type weakly acidic ion exchange resin and at the same time to obtain a di-sodium phosphate solution.

The term "crude phosphoric acid" used herein indicates a dilute phosphoric acid solution, impure phosphoric solution not containing anions other than phosphoric acid but containing various cations, and dilute, impure phosphoric acid solution, while the term "crude caustic sodium solution" indicates a very dilute caustic sodium solution which is otherwise hardly usable, or caustic sodium solution containing various impurities such as a direct electrolyte of brine.

The process of the invention may be also divided into the following steps:

(1) A step for converting an anion exchange resin to an $H_2PO_4$ type;
(2) A step for converting an $H_2PO_4$ type anion exchange resin to an anion exchange resin selected from the group consisting of OH, $PO_4$ and $HPO_4$ type resins or a mixture thereof, and at the same time producing mono-sodium phosphate;
(3) A step wherein an acid type cation exchange resin is passed through a dilute impure caustic sodium solution to be converted to a sodium type and then the resin thus converted is passed through a mono-sodium phosphate solution to be re-converted to an acid type, and at the same time a di-sodium phosphate solution is obtained.

The first step of conversion of an anion exchange resin to $H_2PO_4$ type is carried out simply by passing aqueous phosphoric acid through the anion exchange resin selected from OH, $PO_4$ or $HPO_4$ type resin or a mixture thereof. The concentration of aqueous phosphoric acid used in this step is not critical and any concentration will do as long as it is not high enough to cause damage to the treated resin. Hence, very dilute phosphoric acid of such a low concentration as 3–4% or less which is unusable for other purposes, and impure phosphoric acid containing cations such as Ca, Fe, Mg, etc. as impurities, may be used. As to the acid containing ions such as Ca, Fe, Al, etc. which are apt to deposit in the resin as phosphate, it is necessary to elute it with excessive phosphoric acid.

As the starting ion exchange resin in this step, it is most preferable to use a polystyrol series polyamine anion exchange resin such as Amberlite IR–45 (anion exchanger, weak base (aminated chloromethylated polystyrene)) and if desired, an anion exchange resin of medium or high basicity may be used. The amount of $P_2O_5$ adsorbed by the resin varies with the kind of resin used and the concentration of the phosphoric acid solution used. In general, a weakly basic anion exchange resin adsorbs 2–2.5 mol/l. of $P_2O_5$, and when the concentration of $P_2O_5$ is 2–3%, it adsorbs 150–180 gr./l. of $P_2O_5$. The adsorption amount is further increased with a concentration of over said percentage.

The second step of conversion of an $H_2PO_4$ type anion exchange resin to an anion exchange resin selected from OH, $PO_4$ or $HPO_4$ type resins or a mixture thereof is attained by passing a di-sodium phosphate solution or its mixture with mono-alkali phosphate through the $H_2PO_4$ anion exchange resin obtained by the first step.

The characteristics of anion exchange resins in a dilute solution have hitherto been studied and investigated theoretically and experimentally from various angles and there are many facts which have been made known. The present invention employs anion exchange resins in a solution of relatively high concentration and we have discovered that the H$_2$PO$_4$ type can be easily converted to an OH, PO$_4$ or HPO$_4$ type by Na$_2$HPO$_4$.

When di-sodium phosphate is passed through an H$_2$PO$_4$ type resin, reactions take place as follows:

R—H$_2$PO$_4$+Na$_2$HPO$_4$=R—HPO$_4$+2NaH$_2$PO$_4$

R—H$_2$PO$_4$+NoOH+NaH$_2$PO$_4$=R—OH+2NaH$_2$PO$_4$

From the elute the required di-sodium phosphate can be obtained. However, it is necessary to elute as much as possible phosphoric acid adsorbed by the resin. For this purpose, a mixture solution of mono-sodium phosphate and di-sodium phosphate is preferably passed through the resin to obtain an aqueous solution of mono-sodium phosphate, and then an aqueous solution of di-sodium phosphate only is passed through the resin thereby to obtain a mixture of mono-sodium phosphate and di-sodium phosphate and at the same time to elute all P$_2$O$_5$ from the resin, thus converting the resin to an OH, PO$_4$ or HPO$_4$ type. With the concentration of di-sodium phosphate used for elution, the concentration of mono-sodium phosphate obtained is varied, and it is therefore preferable to use a solution of di-sodium phosphate of as high concentration as possible from the viewpoint of cost required for concentrating and drying of the product. Besides, it must be the solution of the concentration which is most economical from the angles of washing water and solubility. For the operation of the second step, it is most appropriate to fill up an ion-exchange column with the resin and to flow the elute down from the top of the column.

The third step is that di-sodium phosphate to be used in the second step is produced by using a portion of mono-sodium phosphate obtained from the second step. The solution of di-sodium phosphate can be obtained by neutralizing a mono-sodium phosphate solution with caustic sodium, sodium carbonate or a mixture thereof. If dilute or impure caustic sodium has to be used for neutralization, water and all impurities will be admixed with the resultant di-sodium phosphate solution, so that its concentration and refining requires enormous cost and labour. Thus, if impure or dilute caustic sodium is used, this solution is first passed through an acid type weakly acidic cation exchange resin intrinsically unable to decompose neutral salts thereby to adsorb cations, but capable of adsorbing free caustic sodium completely. Accordingly, when dilute caustic sodium is used, it is only water that is discharged from the resin. Moreover, if caustic sodium contains impurities as mentioned above, these impurities also come out with water. After an acid type weakly acidic cation exchange resin becomes a sodium type by passing caustic sodium therethrough, the resin is rinsed with a suitable amount of water to wash away impurities attached thereto. Then, by passing the mono-sodium phosphate solution which was obtained by the second step, the resin is converted again to an acid type, and di-sodium phosphate is obtained as elute. In this case, the liquor to be passed through the resin requires a pH of less than 5. When a cation exchange resin of sodium type is employed in an ion exchange column and mono-sodium phosphate solution is flown down from the top of the column, a liquor of di-sodium phosphate only comes out at first, and then a mixture of di-sodium and mono-sodium phosphate follows. Thus, the first elute is taken out as a product, while the second elute is used in the preceding step. It is therefore necessary that the amount of mono-sodium phosphate to be used in the third step is more than 1.5 times the quantity of di-sodium phosphate produced by reaction with sodium adsorbed by the resin.

As described above, caustic sodium used is all charged to sodium phosphate containing no impurity therein and without loss in the course of operation. A metacryl series weakly acidic cation exchange resin such as Amberlite IRC–50 is preferably used as the ion exchange resin in the third step.

According to the present invention, pure and concentrated alkali phosphate or crystals thereof can be produced from impure, dilute phosphoric acid and caustic alkali by cyclic operation of the said three steps, without causing any substantial loss of phosphoric acid and sodium during the operation.

The present invention will be now clarified in the following examples:

*Example 1*

3720 gr. of 4% phosphoric acid solution containing 149 gr. of P$_2$O$_5$ were passed through 1200 cc. of Amberlite IR–45 whereby the latter was converted from HPO$_4$ to H$_2$PO$_4$ type, and then 1385 gr. of a liquor containing 262 gr. of Na$_2$HPO$_4$ and 106 gr. of NaH$_2$PO$_4$ were passed therethrough to obtain 1965 gr. of a liquor (I) containing 550 gr. of NaH$_2$PO$_4$ and 23 gr. of H$_3$PO$_4$. On the other hand, 1300 gr. of impure caustic soda solution containing 140 gr. of NaOH and 137 gr. of NaCl were passed through 1000 cc. of Amberlite IRC–50, weakly acidic cation exchange resin (which was previously converted to acid type), by which the resin was converted to Na type and washed in 400 gr. of water to obtain 1620 gr. of a liquor containing 137 gr. of NaCl.

The liquor thus obtained is passed through the above-mentioned liquor (I) and then washed in 400 gr. of water to obtain 2445 gr. of a liquor containing 463 gr. of Na$_2$HPO$_4$ and 187 gr. of NaH$_2$PO$_4$. The resin which is acid type is used for the next operation. Of the liquor, 1060 gr. were converted to the product and the remainder was used for the second step.

*Example 2*

994 gr. of 15% phosphoric acid solution containing Ca, Fe, Al as impurities and 149 gr. of P$_2$O$_5$ were passed through 1000 cc. of Amberlite IR–45 converted to HPO$_4$ type. Further, by passing 1500 gr. of the same solution, salts of Fe, Al and Ca deposited on the resin were dissolved. The resin was washed with 400 gr. of water and converted to H$_2$PO$_4$ and then sodium phosphate was produced in the same way as in Example 1.

*Example 3*

1500 gr. of a liquor containing 150 gr. NaOH and 250 gr. NaNO$_3$ were passed through 1000 cc. of acid type weakly acidic cation exchange resin IRC–50 which were subsequently washed with 400 gr. of water. The liquor thus obtained was used for recovery of NaNO$_3$. 2700 gr. of a liquor containing 700 gr. NaH$_2$PO$_4$ and 113 gr. Na$_2$HPO$_4$ were passed through the resin at a liquor temperature of 80° C. and then washed with 300 gr. of water. 1500 gr. of the first elute were cooled to separate 12 gr. Na$_2$HPO$_4$ and 672 gr. H$_2$O, of which the former was taken out as the product. The filtrate was mixed with the second elute. This mixture, to which was further added 273 gr. of a liquor containing 184 gr. of H$_3$PO$_4$, was used for the next elution.

*Example 4*

An ion exchange column was filled with 1000 cc. of Amberlite IR–45, weakly basic ion exchange resin which has been made an HPO$_4$ type, and 7000 cc. of phosphoric acid solution containing 3% P$_2$O$_5$ and cations of impurities such as Fe, Mg, Ca, Al was flown from the top of the column to pass therethrough. When 3500 cc. of the solution was first passed through the column, phosphates of Fe, Mg, Ca, Al were deposited in the resin and water was discharged.

Further, by passing the remaining 3500 cc. of the solution, the deposit in the resin was dissolved thereby to elute an impure phosphoric acid liquor and to convert the resin to an H$_2$PO$_4$ type. Then, after washing with 400 cc. of water, sodium phosphate solution comprising 360 gr. Na$_2$HPO$_4$, 70 gr. NaH$_2$PO$_4$ and 1400 gr. water was flown down through the column from the top thereof to convert the resin of $H_2PO_4$ type to $HPO_4$ type and to obtain sodium phosphate comprising 476 gr. $NaH_2PO_4$, 120 gr. $Na_2HPO_4$ and 1900 gr. water. This sodium phosphate was neutralized with 180 gr. of sodium carbonate to obtain a liquor comprising 600 gr. $Na_2HPO_4$, 40 gr. $NaH_2PO_4$ and 1900 gr. water. Of this liquor thus obtained, two-fifths are taken out from the system as the product and the remainder is circulated for re-use in the operation.

*Example 5*

An ion exchange column was filled with 1000 cc. of weakly basic anion exchange resin Amberlite IR–45 pre-converted to $HPO_4$ type. 3500 cc. of dilute phosphoric acid containing 3% $P_2O_5$ were flown down from the top of the column in such a way that the first batch of 1000 cc. was passed through the resin at the rate of SV 2 (SV represents a liquid amount passed per hour for a unit volume of resin) and the remaining batch of 2500 cc. was passed at the rate of SV 10, thereby to convert the resin from $HPO_4$ to $H_2PO_4$ type. Of the liquor thus passed, 650 cc. of the first discharge contain di-sodium phosphate remained in the column, so that it is added to a di-sodium phosphate solution obtained later, and the remainder is discarded. Thereafter, 1500 cc. of dilute phosphoric acid containing 3% $P_2O_5$ were fed into the column from the bottom to wash the resin from below, thereby driving gas out of the resin and completing the conversion of $HPO_4$ type resin to $H_2PO_4$ type. Then, sodium phosphate solution comprising 360 gr. $Na_2HPO_4$, 70 gr. $NaH_2PO_4$ and 1400 cc. water was fed into the column from the top in such a way that 600 cc. of the first half were passed therethrough at the rate of SV 2 to be returned to the material phosphoric acid, and all of the second half was passed at the rate of SV 5 thereby converting the resin from $H_2PO_4$ to $HPO_4$ type and obtaining from the bottom of the column a sodium phosphate solution comprising 476 gr. $NaH_2PO_4$, 120 gr. $Na_2HPO_4$ and 1900 cc. water. This solution was neutralized with 180 gr. of sodium carbonate to obtain a solution composed of 600 gr. $Na_2HPO_4$, 40 gr. $NaH_2PO_4$ and 1900 cc. water, of which two-fifths were taken out of the system as the product, and the rest was re-used in the above operation.

*Example 6*

In the same way as in Example 5, phosphoric acid containing 3% $P_2O_5$ was flown through an $HPO_4$ type anion exchange resin, Amberlite IR–45, thereby to convert the resin to $H_2PO_4$ type. Then, di-sodium phosphate solution composed of 600 gr. $Na_2HPO_4$ and 1800 cc. water was fed into the column from the top thereof in such a way that 600 cc. of the first half were passed at the rate of SV 2 to send the elute back to the material phosphoric acid, while the rest was passed at the rate of SV 5 thereby to convert the resin from $H_2PO_4$ to $HPO_4$ type and at the same time to obtain from the bottom of the column aqueous sodium phosphate composed of 423 gr. $NaH_2PO_4$, 350 gr. $Na_2HPO_4$ and 2300 cc. water. The solution thus obtained was neutralized with 187 gr. of sodium carbonate to obtain a liquid composed of 850 gr. $Na_2HPO_4$ and 2361 cc. water, from which a liquid containing 250 gr. of $Na_2HPO_4$ was taken out of the system as the product and the rest was re-used in the above operation.

*Example 7*

In the same way as in Example 5, phosphoric acid containing 3% $P_2O_5$ was flown through an $HPO_4$ type anion exchange resin, Amberlite IR–45, thereby to convert the resin to an $H_2PO_4$ type. Then, sodium phosphate solution composed of 250 gr. $Na_2HPO_4$, 100 gr. $NaH_2PO_4$ and 1300 cc. water was fed into the column from the top thereof in such a way that 600 cc. of the first half were passed at the rate of SV 2 to send the elute back to the material phosphoric acid, while the rest was passed at the rate of SV 5 thereby to convert the resin from $H_2PO_4$ to $HPO_4$ type and at the same time to obtain from the bottom of the column mono-sodium phosphate solution composed of 422 gr. $NaH_2PO_4$ and 1750 cc. water, of which a solution containing 211 gr. of $NaH_2PO_4$ was taken out of the system as the product, and the rest was neutralized with 93.5 gr. of sodium carbonate to form di-sodium phosphate which is re-used in the above operation.

Further, the di-sodium phosphate thus produced may be neutralized with caustic soda or sodium carbonate to produce trisodium phosphate. The di-sodium phosphate may also have added thereto mono-sodium phosphate, an intermediate product, to form a mixture thereof. A portion of said mono-sodium phosphate can be discharged out of the system to be recovered.

*Example 8*

1300 gr. of impure caustic liquid containing 140 gr. NaOH and 137 gr. NaCl were passed through 1000 cc. of acid type weakly acidic cation exchange resin, Amberlite IRC–50, to convert the resin to Na type. Then, the resin was rinsed with 400 gr. of washing water to obtain 1620 gr. of a liquid containing 137 gr. NaCl. Thereafter, the resin was passed through 1965 gr. of liquor (I) containing 550 gr. $NaH_2PO_4$ and 23 gr. $H_3PO_4$ and washed with 400 gr. of water whereby 2445 gr. of a liquid containing 463 gr. $Na_2HPO_4$ and 187 gr. $NaH_2PO_4$ was obtained. The resin now converted to acid type is used in the next operation. Of the liquid thus obtained, 1060 gr. were taken out as the product and the rest was flown through 1200 cc. of $N_2PO_4$ type weakly basic anion exchange resin, IRA–45, thereby to obtain 1965 gr. of a liquid containing 550 gr. $NaH_2PO_4$ and 23 gr. $H_3PO_4$. This liquid is used as the liquor (I) in the next operation. After the liquor (I) was obtained, 3720 gr. of 4% phosphoric acid solution containing 149 gr. of $P_2O_5$ were flown to pass through 1200 cc. of IRA–45 thereby to convert the resin to $H_2PO_4$ type. The resin thus reconverted is used in the next operation.

*Example 9*

15 kg. of a liquid containing 140 gr. NaOH, 230 gr. NaCl and 105 gr. $Na_2SO_4$ were passed through 1000 cc. of Amberlite IRC–50 which had been pre-converted to acid type. The resin was thus converted to Na type and washed with 1000 gr. of water thereby removing NaCl and $Na_2SO_4$ from the resin. In the same way as in Example 8, sodium phosphate was produced.

*Example 10*

1500 gr. of a liquid containing 150 gr. NaOH and 250 gr. $NaNO_3$ were passed through 1000 cc. of acid type weakly acidic cation exchange resin, Amerlite IRC–50. The resin was then washed with 400 gr. of water. The liquid thus obtained is used for recovery of $NaNO_3$. 2700 gr. of a liquid containing 700 gr. $NaH_2PO_4$ and 113 gr. $Na_2HPO_4$ were passed through resin at the liquid temperature of 80° C. and then the resin was washed with 300 gr. of water. 1500 gr. of the first elute were cooled whereby 12 gr. of $Na_2HPO_4$ were separated with 672 gr. $H_2O$ and taken out as the product. Further, the filtrate was mixed with the second elute and added with 273 gr. of a liquid containing 184 gr. $H_3PO_4$. This mixture is used in the next elution.

What is claimed is:

A process for the production of sodium phosphate including a substantial quantity of di-sodium phosphate from a crude dilute phosphoric acid solution and an electrolytic cell solution containing sodium hydroxide and sodium chloride, said method comprising a first step of passing said crude phosphoric acid solution through a polystyrol series polyamine anion exchange resin of OH type, thereby converting said anion exchange resin to an $H_2PO_4$ type; a second step of passing a solution of sodium phosphate containing di-sodium phosphate through the $H_2PO_4$ type resin, thereby converting said resin to resins of OH, $PO_4$ and $HPO_4$ types thereby obtaining a sodium phosphate solution rich in mono-sodium phosphate, the OH type resin being used in said first step; a third step of passing the electrolytic cell solution containing sodium hydroxide and sodium chloride through a methacrylic-acid-series weakly acidic cation-exchange resin of the formula Rca-H, wherein Rca is a cation-exchange resin residue to convert the resin to an alkaline resin composed of the said resin residue combined with the sodium contained in the caustic sodium of the electrolytic cell solution; a fourth step of passing the mono-sodium phosphate rich solution obtained from the second step through the converted resin obtained from the third step thereby producing sodium phosphate solution containing a substantial quantity of di-sodium phosphate; and a fifth step of withdrawing a part of this solution as a product and recycling the other part of the solution to the second step.

References Cited in the file of this patent

UNITED STATES PATENTS 2,157,511    Urbain et al. _____ May 9, 1939